United States Patent
Sharma

(10) Patent No.: US 8,965,746 B2
(45) Date of Patent: Feb. 24, 2015

(54) SYSTEM AND METHOD FOR VALIDATING AN ELECTRICAL NETWORK MODEL

(75) Inventor: Prashant Sharma, Cumming, GA (US)

(73) Assignee: General Electric Company, Schenectady, NY (US)

( * ) Notice: Subject to any disclaimer, the term of this patent is extended or adjusted under 35 U.S.C. 154(b) by 483 days.

(21) Appl. No.: 13/344,326

(22) Filed: Jan. 5, 2012

(65) Prior Publication Data

US 2013/0179140 A1    Jul. 11, 2013

(51) Int. Cl.
G06F 17/50 (2006.01)
G05B 17/02 (2006.01)

(52) U.S. Cl.
CPC .......... *G06F 17/509* (2013.01); *G06F 2217/04* (2013.01); *G06F 17/504* (2013.01); *G05B 17/02* (2013.01)
USPC ......................................................... 703/13

(58) Field of Classification Search
CPC . G06F 17/509; G06F 2217/04; G06F 17/504; G05B 17/02
USPC ......................................................... 703/13
See application file for complete search history.

(56) References Cited

U.S. PATENT DOCUMENTS

2012/0078809 A1* 3/2012 Day .............................. 705/348

OTHER PUBLICATIONS

North Dehli Power Limited, "GIS Mapping & Operations Resource Management (Addendum 1)" Jul. 14, 2004, 85 pages.*
U.S. Appl. No. 13/344,554, filed Jan. 5, 2012, Zaher, et al.
U.S. Appl. No. 13/352,227, filed Jan. 17, 2012, Fan, et al.
U.S. Appl. No. 13/187,336, filed Jul. 20, 2011, Fan, et al.

* cited by examiner

*Primary Examiner* — Dwin M Craig
(74) *Attorney, Agent, or Firm* — Fletcher Yoder, P.C.

(57) ABSTRACT

Systems and methods for validating electrical network models are provided. Systems include a memory configured to store electrical network model data for an electrical network. The electronic device also includes data processing circuitry configured to define in the memory an electrical network model object based, at least in part, on the electrical network model data. The data processing circuitry is further configured to create copies of the electrical network model object in the memory, wherein each copy of the electrical network model object corresponds to a respective set of rules, and wherein each set of rules independently defines a plurality of constraints relating to at least a portion of a plurality of parameters of the electrical network. The data processing circuitry is further configured to determine, in parallel, whether each copy of the electrical network model object is valid with respect to the corresponding set of rules.

20 Claims, 4 Drawing Sheets

SYSTEM AND METHOD FOR VALIDATING AN ELECTRICAL NETWORK MODEL

BACKGROUND OF THE INVENTION

The subject matter disclosed herein relates to electrical networks, and more specifically, to validating models of electrical networks.

A utility company may control many aspects of an electrical network under its management. For example, the utility company may control which components are present in the electrical network (e.g., power sources, transmission lines, transformers, capacitors, switches, and the like), how these components are relatively positioned and connected relative to one another within the electrical network, and how these components operate. Accordingly, the utility company may, at various points in time, desire to alter one or more parameters of the electrical network. That is, the utility company may desire to add components to or remove components from the electrical network, change the connectivity of components in the electrical network, or change the operational parameters of the components of the electrical network when performing maintenance, upgrades, or repairs to the electrical network.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In one embodiment, a system for validating electrical network model data includes a communication interface that receives electrical network model data with parameters that define the structure and operation of an electrical network. A memory stores the electrical network model data. Data processing circuitry defines, in memory, an electrical network model object using the electrical network model data. The data processing circuitry creates copies of the electrical network model object in the memory. Each copy of the electrical network model object corresponds to a respective set of rules, and each set of rules independently defines a plurality of constraints relating to at least a portion of the plurality of parameters of the electrical network. The data processing circuitry then determines, in parallel, whether each copy of the electrical network model object is valid with respect to the corresponding set of rules.

In another embodiment, a method for validating an electrical network model includes receiving an electrical network model defining parameters of an electrical network. An electrical network model object is created in memory from the electrical network model. A first duplicate of the electrical network model object corresponding to a first independent rule set is created in memory. A second duplicate of the electrical network model object corresponding to a second independent rule set is created in memory. The first and second independent rule sets define requirements for the plurality of parameters of the electrical network. The first duplicate of the electrical network model object is validated against the first independent rule set while the second duplicate of the electrical network model object is simultaneously validated against the second independent rule set.

In another embodiment, an article of manufacture includes one or more computer-readable media storing instructions to determine the validity of an electrical network model. The instructions include instructions to create an object in a memory corresponding to a received electrical network model. They also include instructions to create a number of object instances, and each of the object instances corresponds to one of a number of rule sets. The rule sets include electrical phase, network connectivity, and power transformation rules sets that respectively define a number of independent electrical phase, network connectivity, and power transformation constraints of the electrical network model. The instructions further include instructions to execute, in parallel, each rule set against the corresponding object instance. Instructions are also included to store the electrical model and the results of the execution of the rule sets in an electronic storage when all of the rule sets have successfully executed against the object instances.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

Figure 1:
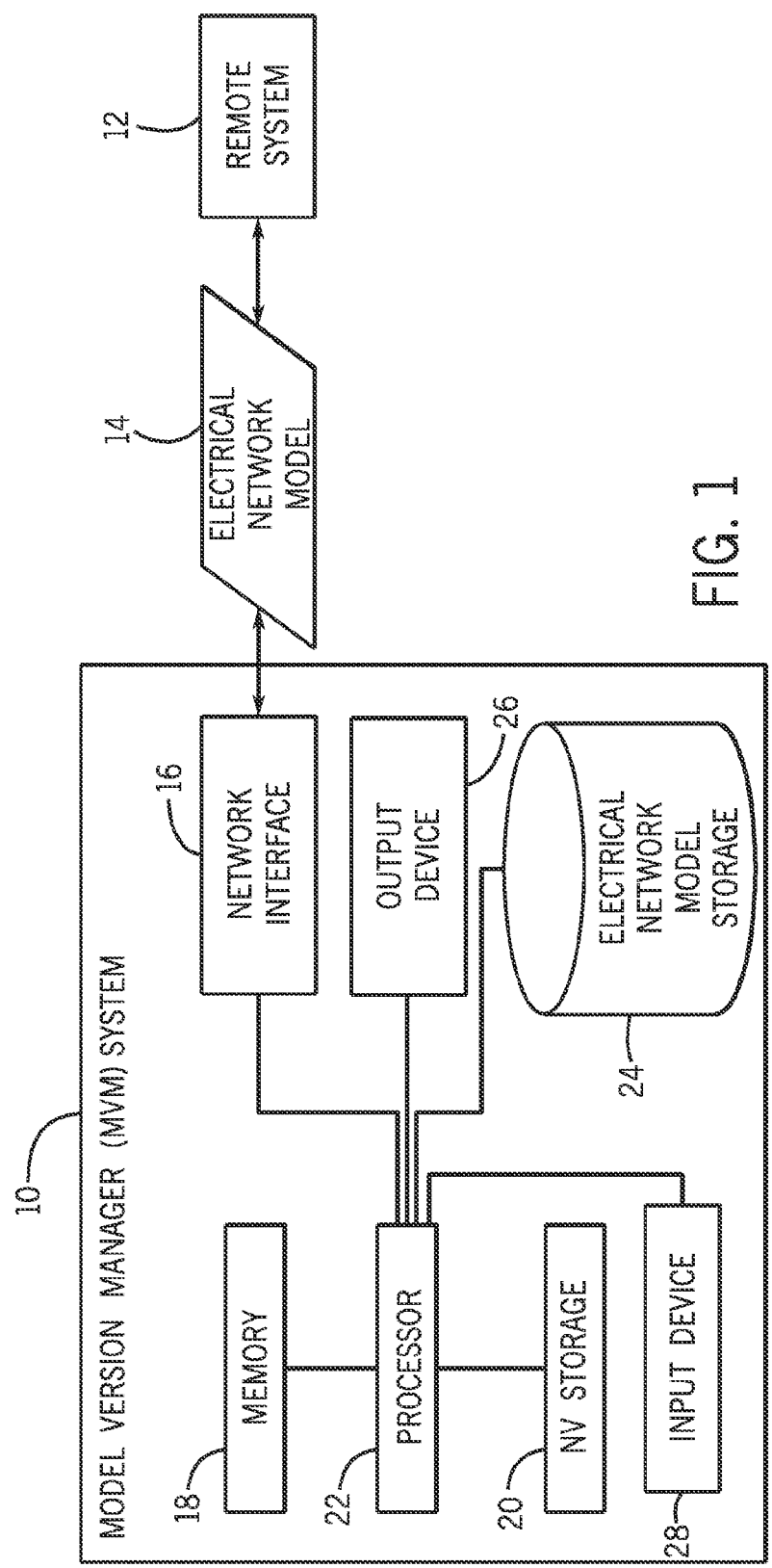
FIG. 1 is a schematic illustrating a model version manager (MVM) system, in accordance with an embodiment.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

When a utility company that is responsible for managing electrical network desires to alter one or more parameters of the electrical network, the utility company may utilize software to model the new parameters of the electrical network to ensure that the resulting modified electrical network will be functional. For example, a utility company may utilize an electrical network model to predict the behavior of a modified electrical network having a particular transformer with a different power rating than the corresponding transformer in the current electrical network. By modeling the modified electrical network, the utility company may be able to predict how the modification affects the remainder of the electrical network, which may help improve maintenance efficiency, reduce maintenance costs, and minimize electrical network down-time.

Accordingly, the present disclosure is directed toward a system and method for validating electrical network models. That is, as presently disclosed, for an electrical network model to be valid (i.e., functional and error-free), it should comply with a number of rules that define the constraints (e.g., physical and design limitations) of the electrical network and/or the electrical network model. For example, these rules may define the data structure, electrical phase, network connectivity, and power transformation constraints for the electrical network model and the electrical network represented. Generally speaking, the presently disclosed rule-based validation technique may offer flexibility to define custom rules as well as the ability to update, insert, or delete rules to modify the constraints on the electrical network and/or the electrical network model.

Additionally, these electrical network models may become quite large (e.g., tens to hundreds or even thousands of megabytes of data) and require a significant amount time to validate against each rule in a serialized fashion. As such, the present disclosure is directed toward creating an object in memory from an electrical network model, and then verifying sets of rules against separate instances of this object in parallel. By simultaneously validating several copies of the electrical network model object, the time spent validating the electrical network model may be significantly reduced. Furthermore, executing these sets of rules against the multiple instances of the object enables the utilization of distributed computing techniques to the electrical network model validation problem for enhanced efficiency.

With the foregoing in mind, FIG. 1 illustrates an example of a model version manager 10 which is generally configured to receive, validate, and store electrical network models. In the example of FIG. 1, the illustrated MVM system 10 is an embodiment of a system configured to receive information regarding the parameters of an electrical network (i.e., electrical network model 14) from a remote system 12 communicatively coupled to the MVM system 10 (e.g., via network interface 16). For example, the remote system 12 may be a geographic information system (GIS), a distributed management system (DMS), or an outage management system (OMS), or other type of that may store information regarding the configuration of an electrical network in the form of an electrical network model 14. Furthermore, the MVM system 10 illustrated in FIG. 1 includes a number of internal components which may be used to validate and or store the received electrical network model 14.

For example, the illustrated MVM system 10 includes a memory 18 and a non-volatile (NV) storage 20 that may be used to store the electrical network model 14 while it is being validated by the processor 22. Furthermore, the processor 22 may execute one or more instructions stored in memory 18 and/or NV storage 20 when validating the received electrical network model 14. In particular, as discussed in detail below, the memory 18 and/or NV storage 20 may store one or more rules which may be used to validate the electrical network model 14. The processor 22 may also execute one or more of these rules against copies of the electrical network model. That is, in order to validate the electrical network model, all of the rules should be successfully executed (e.g., by processor 22) against the copies of the electrical network model. Additionally, in certain embodiments, the processor 22 may include 1, 2, 5, 10, 20, 100, 1000, 10,000, or any suitable number of computing cores to independently execute instructions to validate a copy of the electrical network model against a set of rules.

Furthermore, an embodiment of a MVM system 10 may, additionally or alternatively, include an electrical network model storage 24 that may store one or more electrical network models 14 once validated. In certain embodiments, the electrical network model storage 24 may include a database or version control system. Furthermore, in certain embodiments such a database or version control system may be used to store validated electrical network models 14 (e.g., as flat files). Additionally, in certain embodiments the electrical network model storage 24 may be physically stored within memory 18 and/or NV storage 20. In certain embodiments, the electrical network model storage 24 may be part of a remote system (e.g., remote system 12) and the MVM system 10 may store the electrical network model 14 in a memory of the remote system 12 after validation.

Furthermore, in certain embodiments the MVM system 10 may include one or more output devices 26 (e.g., a monitor, flat-panel display, projector, printer, or similar output device) which may output information regarding the operation of the MVM system 10 and/or the electrical network model validation process. For example, the output device 26 may inform a user of the successful completion of a validation of the electrical network model 14 or errors encountered during the validation process. Additionally, the illustrated MVM system 10 includes one or more input devices 28 which may be used to input additional information (e.g., settings and parameters of the validation process, rules, electrical network model information, and the like) which may be used when validating the electrical network model 14.

The electrical network model 14 may include one or more files that have information regarding an electrical network. In certain embodiments, the electrical network that is described by the electrical network model may be an electrical network configuration that an electrical utility provider desires to implement and, furthermore, desires to validate prior to implementation. In certain embodiments, this electrical network model 14 may be in a common information model (CIM) format and/or an extensible markup language (XML) format. Generally speaking, these files and may define values for a plurality of attributes or parameters to describe the electrical network. That is, an electrical network model 14 may be one or more XML files that define the connectivity and operational parameters of the various components of the electrical network.

Figure 2:
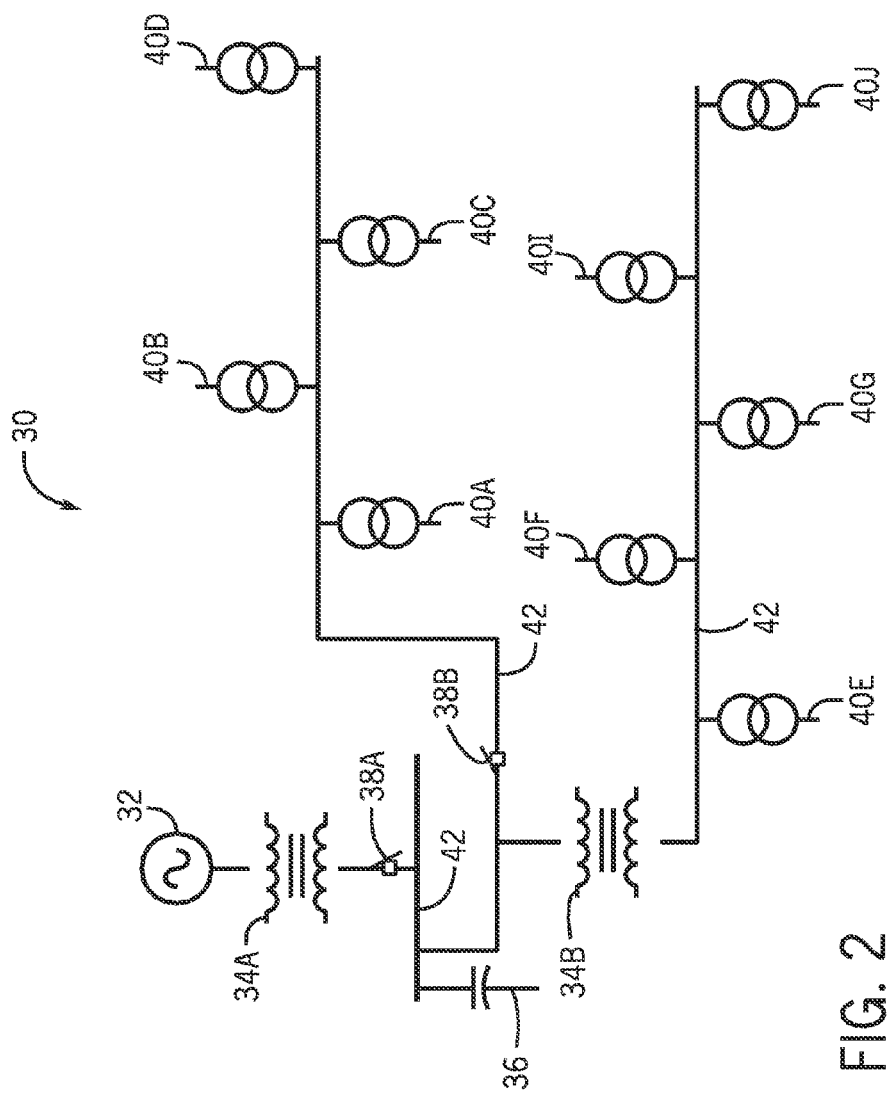
FIG. 2 is a schematic illustrating an electrical network, in accordance with an embodiment.

An electrical network managed by a utility company may have a number of different electrical components arranged in a particular fashion. One example of such an electrical network 30 is illustrated in FIG. 2. Generally speaking, the illustrated electrical network 30 may be described by the electrical network model 14, which may be validated by the MVM system 10. In the illustrated electrical network 30, a number of different components are illustrated electrically coupled to one another in a particular fashion. For example, the illustrated electrical network 30 includes a power source 32, transformers (e.g., transformers 34A and 34B), capacitor 36, switches (e.g., switches 38A and 38B), and load transformers (e.g., load transformers 40A-J) coupled at various points along a number of transmission lines 42.

Each component of the illustrated electrical network 30 has one or more parameters that define the behavior and the limitations of the component. For example, each component may have a location parameter that describes the relative position and connectivity of the component in the electrical network 30. By further example, a power source 32 may have a number of parameters that define power output limitations, power phase constraints, and the like. Transformers 34A and 34B may have parameters that define power ratings, available capacities, and power phase. Additionally, capacitor 36 may have parameters that define how much charge may be stored and/or how quickly it may be charged or discharged. Also, load transformers 40A-F may each have parameters that define power ratings and/or power phases. Furthermore, transmission lines 42 may have parameters that define particular voltages, currents, phases, resistances, and capacities at different points in the electrical network 30. As such, all of the information describing the connectivity, physical limitations and the operation of each of the components of the electrical network 30 may be included as parameters in the electrical network model 14.

Figure 3:
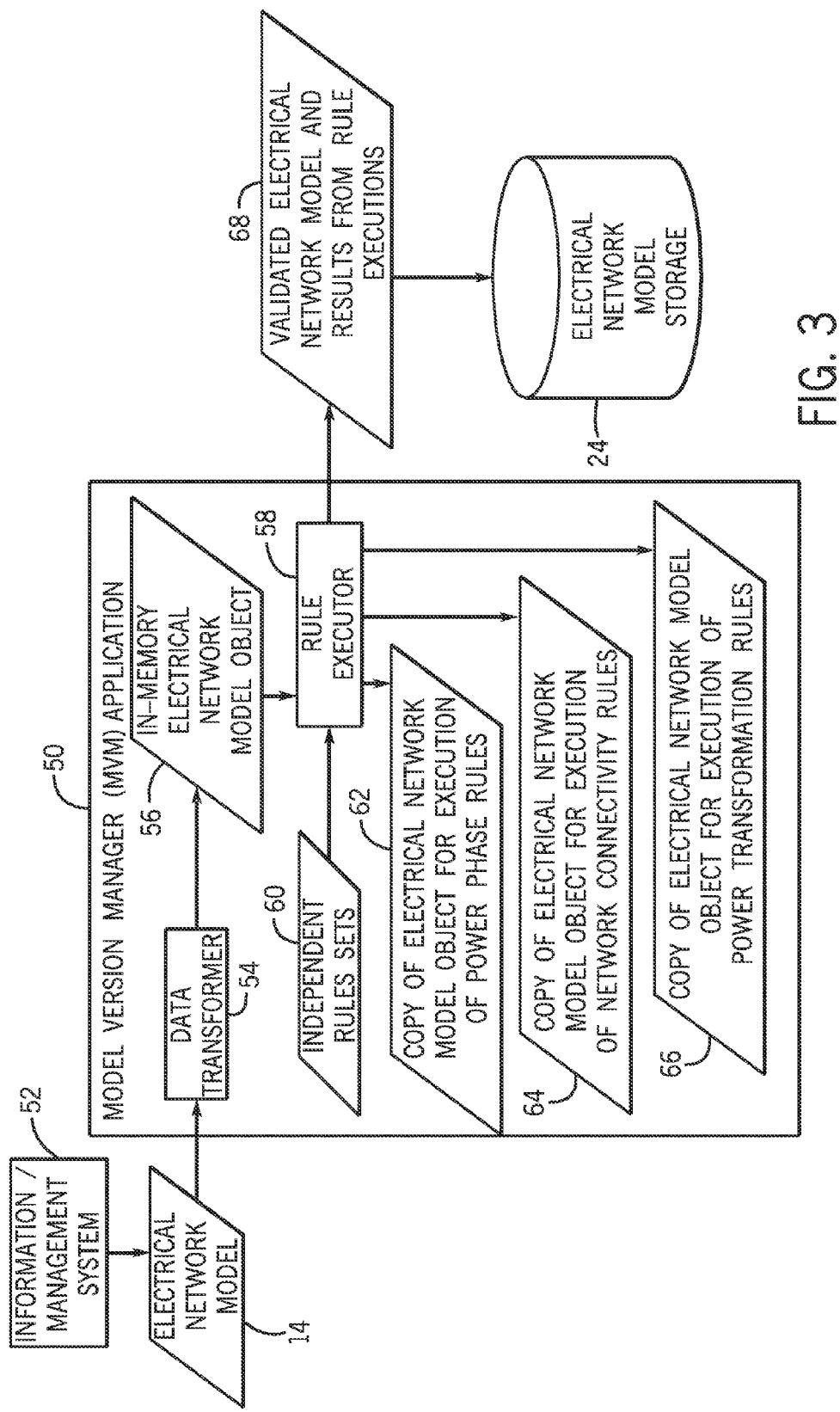
FIG. 3 is a flow diagram illustrating a model version manager (MVM) application, in accordance with an embodiment.

FIG. 3 illustrates an example of a model version manager (MVM) application 50. The MVM application 50 which may be stored in memory 18 and executed by processor 22 of the MVM system 10 to validate an electrical network model 14 (e.g., received from a GIS, DMS, or OMS system 52). In certain embodiments, some or all of the execution of the MVM application 50 may be distributed across a number of processors and memories in a distributed computing environment. In the illustrated embodiment, the MVM application 50 receives the electrical network model 14 and uses a data transformer 54 to import the received electrical network model 14 and to create an electrical network model object 56 in memory (e.g., memory 18). The data transformer 54 may include one or more instructions which may be stored in memory 18 and/or NV storage 20 and executed by the processor 22 in order to translate the parameters of the electrical network 30 (i.e., defined in the electrical network model 14) into an in-memory electrical network model object 56. For example, the data transformer 54 may include an XML parser which may parse and import the parameters of an electrical network 30 defined in a CIM-XML electrical network model data file.

Once the electrical network model object 56 has been defined in memory (e.g., memory 18), a rule executor 58 of the MVM application 50 may execute one or more independent rule sets 60 against copies of the in-memory electrical network model object 56. Generally speaking, if each of independent rule sets 60 successfully executes against the corresponding copy of the electrical network model object 56 without an error, then the electrical network model 14 may be considered valid. The rule executor 58 may include a set of instructions which may be stored in memory 18 and/or NV storage 20 and executed by the processor 22 in order to validate each copy (e.g., clone or instance) of the electrical network model object 56 against a corresponding one of the independent rule sets 60. It should be noted that utilizing a rules-based validation approach generally allows a user of the MVM application to (e.g., via input device 28) define custom rules, and to update, insert, and/or delete the rules of the independent rule sets 60 at any time before or during the validation process. By altering these rules, a user may immediately modify the desired constraints of the electrical network and/or the electrical network model. It should be noted that, as used herein, the term "rule set" generally refers to one or more rules that an electrical network model follows to be valid. It should also be noted that, as used herein, the term "independent rule set" refers to a rule set, wherein the result of the execution of the rules in an independent rule set do not depend on the results of the execution of any other rules outside the independent rule set. Therefore, an independent rule set is a set of rules that may be independently validated against a copy of the electrical network model object 56.

As such, the rule executor 58 may make a copy of the in memory electrical network model object 56 for each independent rule set in the independent rule sets 60. By using a separate copy of the electrical network model object 56 to validate each of the independent rule sets 60, the MVM application 50 enables the parallel validation of each copy of the electrical network model object 56. That is, since each of the rule sets are independent of one another in terms of execution, each of the independent rule sets 60 may be executed in parallel against the corresponding copy of the in-memory electrical network model object 56, affording a significant efficiency improvement over serialized rule execution. Furthermore, in certain embodiments in which the MVM system 10 includes a processor 22 having multiple processing cores, each processing core of the processor 22 may be used to validate a different copy of the electrical network model object 56 against its corresponding independent rule set.

Accordingly, the presently disclosed technique enables the parallel validation of each of the independent rule sets. For example, one rule set in the independent rule sets 60 may include one or more rules to validate the phase of the power delivered throughout the electrical network 30. That is, an electrical phase rule set may ensure that the phases of the power delivered to various points in the electrical network 10 are appropriate and desirable. As such, the rule executor 58 may make a copy 62 of the electrical network model object 56 to validate the electrical phase rule set. By further example, another rule set in the independent rule sets 60 may include one or more rules to validate network connectivity throughout the electrical network 30. That is, a network connectivity rule set may ensure that there are no electrical short-circuits or islands present within an electrical network 30. As such, the rule executor 58 may make a copy 64 of the electrical network model object 56 in order to validate this network connectivity rule set. Additionally, another rule set in the independent rule sets 60 may include one or more rules to validate the transformation of power throughout the electrical network 30. That is, a power transformation rule set may ensure that power is appropriately transformed (i.e., stepped between different voltages) within the electrical network 30 (e.g., at transformers 34A-B or at load transformers 40A-J). As such, the rule executor 58 may make a copy 66 of the electrical network model object 56 to validate the power transformation rule set. In each case, once the object copy (e.g., object copies 62, 64, or 66) has been created, the verification of the object copy against the corresponding independent rule set may immediately begin. It should be noted that the independent rule sets described above are examples of independent rule sets 60, and that any number of independent rule sets 60 may be used to verify any aspect of the electrical network model 14 and/or the electrical network 30.

In certain embodiments, the MVM application 50 may use an object-oriented programming language to define and copy the in-memory electrical network model object 56. For example, the electrical network model object 56 may be an object defined in C++, C#, Java, or another similar language having object oriented features. Accordingly, it should be noted that "copies" of the electrical network model object 56, as used herein, may refer to a copy, instance, or clone of the electrical network model object 56. Furthermore, in certain embodiments, the MVM application 50 may take advantage of features of certain object-oriented programming languages involving the efficient cloning of objects. That is, it should be noted that many object-oriented programming languages include mechanisms by which objects may be cloned and/or instantiated in such a way as is more efficient (e.g., in terms of processing time and/or storage space) than manually creating a separate copy of the object (i.e., a new object) in memory. As such, when the rule executor 58 makes copies of the in-memory electrical network model object 56, these mechanisms may be utilized to improve the efficiency of the execution of the MVM application 50. Furthermore, some of these object-oriented languages may additionally include distributed computing functionality which may allow for the instantiation or cloning of objects, as well as the execution of the independent rule sets 60, across any number of memories and processors in a distributed computing environment. As such, the MVM application 50 may take advantage of such features to enable multiple processors and memories be used such that the independent rule sets 60 may be verified in parallel using these distributed computing resources.

Accordingly, when the rule executor 58 has completed executing each of the independent rule sets 60 against each of the corresponding copies (e.g., object copy 62, 64, or 66) of the electrical network model object 56, the rule executor 58 may output the validated electrical network model 68 (e.g., a CIM-XML flat file containing the electrical network model data). Furthermore, in certain embodiments, the rule executor 58 may also output the results of the execution of each of the rules in the independent rule sets 60. As such, the verified electrical network model and the results from the execution of the various rules may be transferred to an electrical network model storage 24 (e.g., within NV storage 20 of the MVM system 10 or within a memory of a remote database system 12). In certain embodiments, all of the electrical network models stored in the electrical network model storage 24 may be presumed valid and ready for implementation. In other embodiments, the results from the execution of the various rules may include one or more warning messages regarding potential concerns with the electrical network model 14 that were not of sufficient concern to invalidate the electrical network model 14. As such, a user of the MVM application 50 may be able to subsequently view and address these warning messages pertaining to the electrical network model 14 prior to implementing the model in an electrical network.

Figure 4:
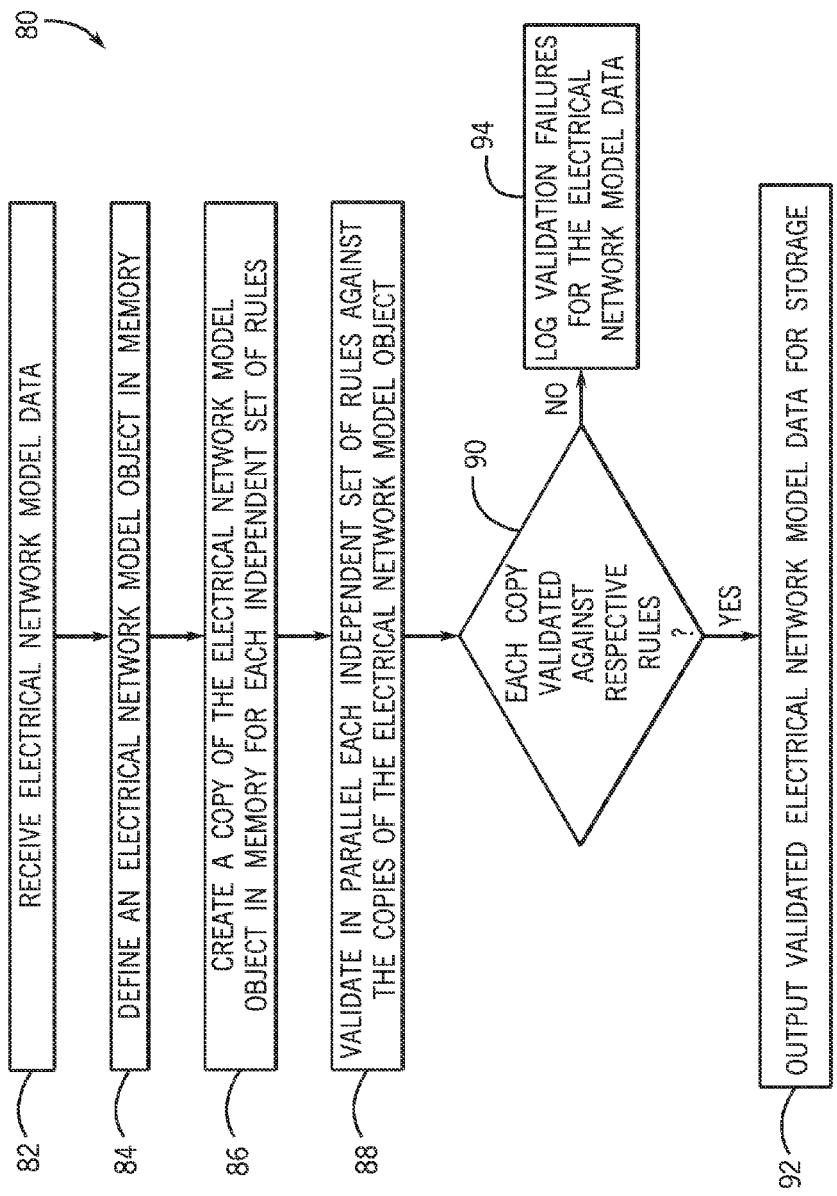
FIG. 4 is a flow diagram illustrating a process by which the MVM application may validate an electrical network, in accordance with an embodiment.

FIG. 4 illustrates an example of a process 80 by which the MVM application 50 may validate an electrical network model 14. The process 80 begins when the MVM application 50 receives (block 82) electrical network model data. For example, the electrical network model data may be a flat file in CIM-XML format and may be received from a remote system 12 via network interface 16. Subsequently, the MVM application 50 (e.g., the data transformer 54) may use the received electrical network model data to create (block 84) an electrical network model object 56 in memory (e.g., memory 18). For example, the MVM application 50 may define an object in Java having a number of attributes that are defined in the electrical network model data. Once the electrical network model object 56 has been defined, the MVM application 50 may create (block 86) a copy of the electrical network model object for each independent set of rules. For example, these copies (e.g., object copies 62, 64, and 66) of the electrical network model object 56 may each be clones of the electrical network model object 56. Once the object copies have been created, the MVM application 50 may validate (block 88) in parallel each independent set of rules against the corresponding copy of the electrical network model object. For example, the MVM application 50 may execute four independent rule sets (e.g., a data structure rule set, a power phase rule set, a network connectivity rule set, and a power transformation rule set) against four clones of the electrical network model object 56, and then store the results in memory (e.g., memory 18).

The MVM application 50 may then determine if (block 90) each copy of the electrical network model object has been validated against the corresponding independent rule set. For example, if all of the clones of the electrical network model object 56 have been validated against their respective independent rule set, then the MVM application 50 may output (block 92) the validated electrical network model data for storage with other validated electrical network models. Additionally, in certain embodiments, the results of the execution of one or more rules in one or more of the independent rule sets may be stored along with the electrical network model data in electrical network model data storage 24. Furthermore, if one or more copies of the electrical network model object fails to be validated against at least one rule in at least one of the independent rule sets, the MVM application 50 may log (block 94) the validation failures of the electrical network model object 56 such that it may be reviewed at a later time.

Technical effects of the invention include enabling the efficient validation of electrical network models. Using the disclosed techniques, a utility company may generally improve efficiency and reduce the cost by validating copies of the electrical network model in parallel against each independent set of rules. Furthermore, the disclosed embodiments utilize features of certain object-oriented languages to further improve the efficiency of the copying (i.e., cloning or instantiation) process. Furthermore, the disclosed techniques enable the validation process to be executed by any suitable number of processors or processing cores, providing further performance gains over serialized rule-based validation of electrical network models.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A system for validating electrical network model data comprising:
    a communication interface configured to receive electrical network model data, wherein the electrical network model data comprises a plurality of parameters that define the structure and operation of an electrical network;
    at least one memory configured to store the electrical network model data and a plurality of independent rule sets, wherein each independent rule set of the plurality of independent rule sets defines an independent set of constraints for at least a portion of the plurality of parameters of the electrical network; and
    a plurality of computing cores configured to:
        generate, in the at least one memory, an electrical network model object based, at least in part, on the electrical network model data;
        generate, in the at least one memory, a plurality of copies of the electrical network model object, wherein each copy of the plurality of copies of the electrical network model object corresponds to a respective independent rule set of the plurality of independent rule sets; and validate, in parallel, each copy of the plurality of copies of the electrical network model object with respect to the corresponding independent rule set using the plurality of computing cores.

2. The system of claim 1, wherein the communication interface is configured to receive the electrical network model data from a geographic information system (GIS), distributed management system (DMS), or outage management system (OMS).

3. The system of claim 1, wherein the electrical network model data is received in a Common Information Model (CIM) Extensible Markup Language (XML) format.

4. The system of claim 1, wherein the plurality of independent rule sets comprises an independent rule set to validate electrical phases throughout the electrical network.

5. The system of claim 1, wherein the plurality of independent rule sets comprises an independent rule set to validate network connectivity throughout the electrical network.

6. The system of claim 1, wherein the plurality of independent rule sets comprises an independent rule set to validate power transformation throughout the electrical network.

7. The system of claim 1, wherein the electrical network model storage comprises a database or a version control system, and wherein the plurality of computing cores is configured to transfer the electrical network model data to the electrical network model storage when each copy of the plurality of copies of the electrical network model object has been determined to be valid.

8. A method for validating an electrical network model comprising:

receiving an electrical network model, wherein the electrical network model defines a plurality of parameters of an electrical network;

generating, in at least one memory, an electrical network model object from the electrical network model;

generating, in the at least one memory, a first duplicate of the electrical network model object corresponding to a first independent rule set and a second duplicate of the electrical network model object corresponding to a second independent rule set, wherein the first and second independent rule sets respectively define independent requirements for at least a portion of the plurality of parameters of the electrical network; and validating the first duplicate of the electrical network model object against the first independent rule set using a first computing core while simultaneously validating the second duplicate of the electrical network model object against the second independent rule set using a second computing core.

9. The method of claim 8, wherein the plurality of parameters of the electrical network comprises electrical phase parameters, and wherein the first or second independent rule set defines requirements for the electrical phase parameters within the electrical network that are independent of other requirements.

10. The method of claim 8, wherein the plurality of parameters of the electrical network comprises network connectivity parameters, and wherein the first or second independent rule set defines requirements for the network connectivity parameters within the electrical network that are independent of other requirements.

11. The method of claim 8, wherein the plurality of parameters of the electrical network comprises power transformation parameters, and wherein the first or second independent rule defines requirements for the power transformation parameters within the electrical network that are independent of other requirements.

12. The method of claim 8, comprising copying the electrical network model to a database or a version control system when the first and second duplicates of the electrical network model object have been validated.

13. The method of claim 8, wherein the first computing core validates the first duplicate of the electrical network model object to produce a first result without relying on a second result produced when the second computing core validates the second duplicate of the electrical network model object.

14. The method of claim 8, wherein the requirements defined by the first independent rule set do not depend on the requirements defined by the second independent rule set.

15. The method of claim 8, comprising modifying, inserting, or deleting at least one requirement defined by the first or second independent rule sets based on user input received before or while validating the first and second duplicates of the electrical network model object.

16. An article of manufacture comprising:

one or more non-transitory computer-readable media at least collectively storing instructions executable by a processor of an electronic device to determine the validity of an electrical network model, the instructions comprising:

instructions to define an object in a memory from the electrical network model;

instructions to instantiate the object to generate a plurality of object instances in the memory, wherein each of the plurality of object instances corresponds to one of a plurality of rule sets, wherein each of the plurality of rule sets respectively defines a plurality of independent constraints of the electrical network model, wherein the plurality of rule sets comprise an electrical phase rule set, a network connectivity rule set, and power transformation rule set;

instructions to validate, in parallel, each of the plurality of object instances against its corresponding rule set using different computing cores of the processor; and instructions to store the electrical model and the results of the validation of each of the plurality of object instances in an electronic storage when all of the plurality of object instances have been successfully validated against the plurality of object instances.

17. The article of manufacture of claim 16, comprising instructions to store the results of the validation of each of the plurality of object instances in the electronic storage when all of the plurality of object instances have not successfully been validated against the plurality of rule sets.

18. The article of manufacture of claim 16, wherein the instructions comprise one or more instructions written in an object-oriented programming language providing mechanisms for defining and instantiating objects.

19. The article of manufacture of claim 18, wherein the instructions comprise one or more instructions written the Java programming language, stored as Java byte-code, or any combination thereof.

20. The article of manufacture of claim 16, wherein the electronic storage comprises a database or a version control system.

* * * * *